US008543973B2

(12) United States Patent
Nguyen et al.

(10) Patent No.: US 8,543,973 B2
(45) Date of Patent: Sep. 24, 2013

(54) METHOD AND SYSTEM FOR PROVIDING AUTHENTICATION SCHEMES FOR WEB SERVICES

(75) Inventors: Nam T. Nguyen, Pleasant Hill, CA (US); Peter Tehchuan Liu, Castro Valley, CA (US); Ayub S. Khan, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1248 days.

(21) Appl. No.: 12/236,391

(22) Filed: Sep. 23, 2008

(65) Prior Publication Data

US 2010/0077461 A1 Mar. 25, 2010

(51) Int. Cl.
G06F 9/44 (2006.01)

(52) U.S. Cl.
USPC ........... 717/106; 717/104; 717/105; 717/107; 717/108; 717/109

(58) Field of Classification Search
USPC .................................. 717/106, 107, 108, 109
See application file for complete search history.

(56) References Cited

U.S. PATENT DOCUMENTS

| | | | | |
|---|---|---|---|---|
| 6,651,168 | B1 * | 11/2003 | Kao et al. ....................... | 713/185 |
| 7,013,469 | B2 * | 3/2006 | Smith et al. .................... | 719/328 |
| 2002/0149601 | A1 * | 10/2002 | Rajarajan et al. ............. | 345/619 |
| 2004/0127277 | A1 * | 7/2004 | Walker et al. .................. | 463/16 |
| 2005/0246716 | A1 * | 11/2005 | Smith et al. .................... | 719/315 |
| 2006/0064468 | A1 * | 3/2006 | Brown et al. .................. | 709/217 |
| 2006/0090197 | A1 * | 4/2006 | Hermann et al. ................ | 726/5 |
| 2007/0100967 | A1 * | 5/2007 | Smith et al. .................... | 709/219 |
| 2009/0077477 | A1 * | 3/2009 | Khan et al. ..................... | 715/760 |

OTHER PUBLICATIONS

J Mitchell-Wong, OpenSocial: From Social Networks to Social Ecosystem, published on Mar. 2007.*
HTTP Authentication: Basic and Digest Access Authentication, published on Jun. 1999.*
OAuth Core 1.0 http://oauth.net/core/1.0/, published on Dec. 4, 2007.*
Ballinger et al ("Web Services Metadata Exchange (WS-MetadataExchange)"), Sep. 2004.*
Hadley ("Web Application Description Language (WADL)"), Mar. 2006.*
Hadley, M. J., "Web Application Description Language (WADL)", Sun Microsystems Labs, Mar. 2006, 28 pages.

* cited by examiner

*Primary Examiner* — Chat Do
*Assistant Examiner* — Jae Jeon
(74) *Attorney, Agent, or Firm* — Osha Liang LLP (57) ABSTRACT

A method for generating authentication code for web service resources. The method includes receiving a selection of a resource method, where the resource method defines a method for interacting with a resource associated with a web service. The method further includes determining an authentication scheme for the resource method, where the authentication scheme defines an authentication mechanism required during execution of the resource method to enable interaction with the resource. The method further includes generating authentication code for the resource method using the authentication scheme, where the authentication code enables a user executing the resource method to interact with the resource.

14 Claims, 7 Drawing Sheets

METHOD AND SYSTEM FOR PROVIDING AUTHENTICATION SCHEMES FOR WEB SERVICES

BACKGROUND

As the Internet continues to serve increasingly sophisticated purposes necessarily changing the way information is communicated, shared, and used, companies having a presence on the Internet have experienced challenges relating to the warehousing of their information. For instance, the introduction of transactional and user-driven features to the Internet paradigm have required a shift from static information models to those more readily promoting greater accessibility to and manipulation of information. One approach in meeting these new demands and better expediting the exchange and use of information, is the Representational State Transfer (REST) model of software architecture.

Under REST, a website can expose information for consumption by others through a web service. A particularly sophisticated website may have a number of associated web services, each addressing a distinct function relating to the storage, retrieval, and manipulation of information. For these RESTful web services, the concept of a resource—a specific source of information referenced using a global identifier—is a central principle. By specifying the appropriate global identifier, a resource can be subject to a set of CRUD-like operations (Create Read Update Delete) collectively known as resource methods; accordingly, invoking resource methods for a particular resource, allows the information associated with the web service through that particular resource to be stored, retrieved, or manipulated.

In making its information easily consumable by third parties, an Internet company provides an application programming interface (API) to facilitate interactions with its web services. By virtue of the API, a developer can create a client application that uses the information associated with the website beneficially for both the website and some ultimate end-user; however, to properly safeguard the information, a need arises for the website to authenticate the client application whenever such access is sought. In addressing that, an authentication mechanism is in place for whenever the client application using the API effectively invokes a web service resource method associated with the website.

One of the challenges facing client application developers is addressing the variety of possible authentication mechanisms that may be required from one web service to the next. Adding to the complexity of the challenge is the scenario where a web service requires a customized authentication mechanism that is not widely known or widely used. For these reasons, complying with a required authentication mechanism for a particular web service can be a burden inflicting some cost with regards to time and effort upon the application developer. This burden is even greater for an application developer tailoring their a client application for consumption of a variety of web services.

SUMMARY

In general, in one aspect, the invention relates to a method for generating authentication code for web service resources. The method includes receiving a selection of a resource method, wherein the resource method defines a method for interacting with a resource associated with a web service. The method further includes determining an authentication scheme for the resource method, wherein the authentication scheme defines an authentication mechanism required during execution of the resource method to enable interaction with the resource. The method further includes generating authentication code for the resource method using the authentication scheme, wherein the authentication code enables a user executing the resource method to interact with the resource.

In general, in one aspect, the invention relates to a system, comprising of a processor, an output device, and an Integrated Development Environment (IDE) executing on the processor to: receive a selection of a resource method, wherein the resource method defines a method for interacting with a resource associated with a web service; determine an authentication scheme for the resource method, wherein the authentication scheme defines an authentication mechanism required during execution of the resource method to enable interaction with the resource; and generate authentication code for the resource method using the authentication scheme, wherein the authentication code is displayed on the output device, and wherein the authentication code enables a user executing the resource method to interact with the resource.

In general, in one aspect, the invention relates to a computer readable medium comprising executable instructions for generating authentication code for web service resources, wherein executable instructions comprise instructions to: obtain a service definition defining a plurality of resources associated with the web service, obtain the authentication scheme; generate a resource model using the service definition, wherein the resource model comprises the plurality of resources, wherein each of the plurality of the resources is associated with a plurality of resource methods, wherein the resource method is one of the plurality of resource methods; generate a menu comprising the plurality of resources in the resource model, wherein each of the plurality of resources is presented with at least one of the plurality of resource methods; receive a selection of a resource method, wherein the resource method defines a method for interacting with a resource associated with a web service; determine a authentication scheme for the resource method, wherein the authentication scheme defines an authentication mechanism required during execution of the resource method to enable interaction with the resource; and generate authentication code for the resource method using the authentication scheme, wherein the authentication code enables a user executing the resource method to interact with the resource.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating authentication code for web service resources. More specifically, a service definition and authentication scheme complying with an authentication schema are used to generate authentication code for a RESTful web service resource, where both the service definition and authentication scheme are associated with the web service to which the resource belongs. In one or more embodiments of the invention, the service definition and authentication scheme for a web service resource may be implemented and provided by developers of the web service; however, in one or more other embodiments of the invention, the service definition and authentication scheme for a web service resource may be implemented and provided by third-party developers not associated with the web service.

Figure 1:
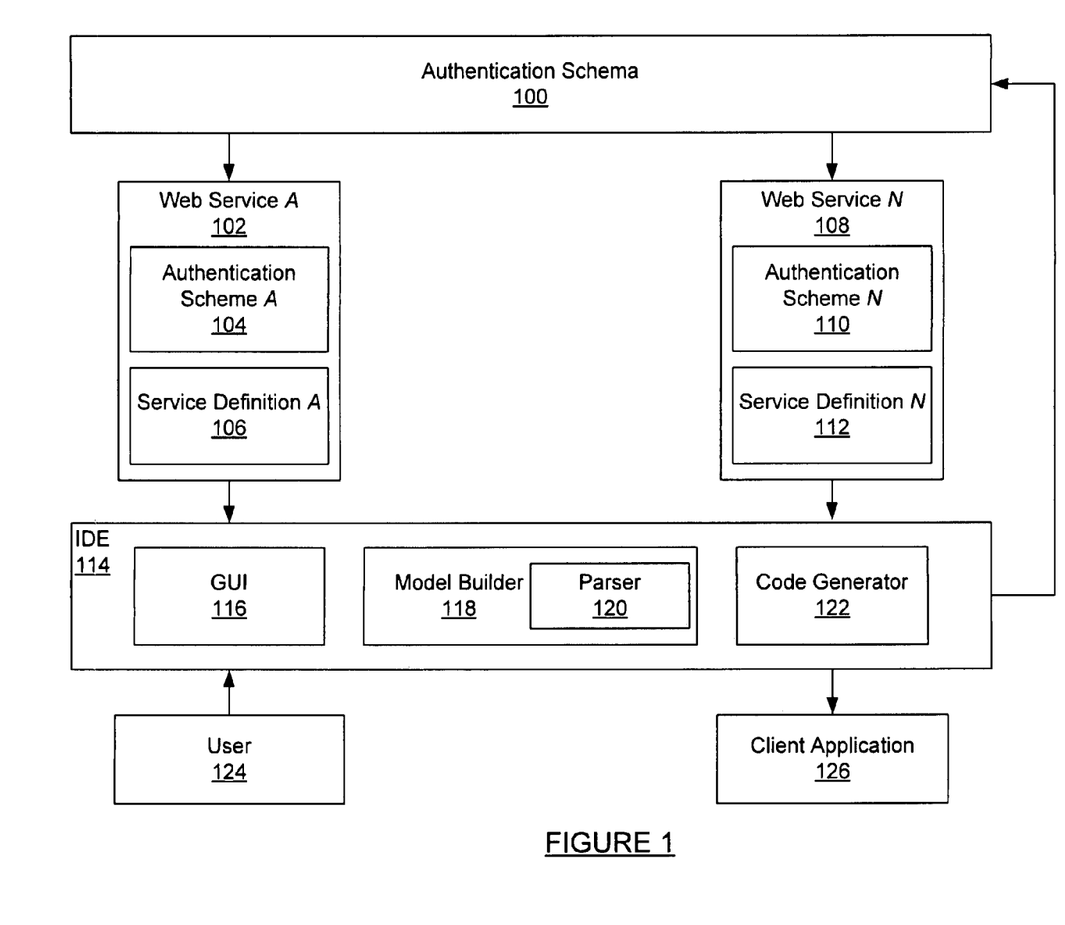
FIG. 1 shows a system in accordance with one or more embodiments of the invention.

FIG. 1 shows a system in accordance with one or more embodiments of the invention. The integrated development environment (114), or IDE, is configured to receive authentication schemes and service definitions from one of a plurality of web services, where each pair of authentication schemes and service definitions are associated with a particular web service. In illustration of this, FIG. 1 shows a first web service (102) associated with a first authentication scheme (104) and a first service definition (106), in addition to a second web service (108) associated with a second authentication scheme (110) and a second service definition (112). The authentication schemes (104 and 110), while distinct, are commonly derived from the same authentication schema (100). Though not shown, there may be additional web services.

In one embodiment of the invention, a web service (102) is a software system designed to support machine-to-machine interaction over a network; in many cases the web service has an interface described in a machine-processable format such as Extensible Markup Language (XML). For instance, a website such as Amazon™ may have a web service directed towards searching for consumer goods, a web service directed towards handling the user login functionality, and a web service directed towards processing transactions between users. In another instance, a website such as Google™, serving a wide variety of functions, has web services directed towards handling geographical mapping and weather information. (Amazon is trademark of Amazon.com, Inc. of Seattle, Wash.; Google is trademark of Google, Inc. of Mountain View, Calif.) With either website, each of the numerous applicable web services provide support to operating over a set of information over a network.

In one or more embodiments of the invention, a service definition may be implemented using Web Application Description Language (WADL)—an XML language used for describing RESTful web service resources. In one or more embodiments of the invention, the service definition may include a top-level <application> element including a single <resources> element. Within the <resources> element, a plurality of <resource> elements may be defined where each <resource> element may recursively include other <resource> elements. Further, each <resource> element includes a plurality of <method> elements. By using WADL to describe the resources and corresponding resource methods associated with a web service, the web service may be defined in terms of its information and the way in which the information may be accessed. The following is an example of a service definition in accordance with one or more embodiments of the invention. The example is not intended to limit the scope of the invention.

EXAMPLE 1

Service Definition

```
<?xml version="1.0" encoding="utf-8"?>
<application xsi:xmlns="http://research.sun.com/wadl/
  <grammars>
    <include href="Chart.xsd"/>
  </grammars>
  <resources base="http://mybookstore.com">
    <resource path="/bookstore" id="bookstore">
      <method name="GET" id="getBooks">
        <request>
          <param name="api-key" type="xsd:string" style="query"
            required="true"/>
        </request>
        <response>
          <representation mediaType="text/xml"
            element="chart:chart"/>
        </response>
      </method>
    </resource>
  </resources>
</application>
```

In one or more embodiments of the invention, an authentication schema specifies a framework with which a web service complies in providing metadata detailing authentication mechanisms required for interactions with the web service. Pursuant to that, in one or more embodiments of the invention where the authentication schema and authentication schemes are implemented using XML, the authentication schema includes the following elements: (i) <saas-services>: for collectively specifying all the information for a given web service, including a description, a display name, authentication metadata, and a service definition; (ii) <group>: for categorizing related web services together; (iii) <description>: for providing a web service identifier; (iv) <display-name>: for providing a web service identifier suited for display to a user; (v) <saas-metadata>: for collectively specifying all the authentication metadata for a web service; (vi) <localizing-bundle>: for enabling localization of generated code to suit different contexts; (vii) <code-gen>: for collectively specifying all the information pertaining to code templates; (viii) <template>: for specifying an identifier unique to a particular authentication function; (ix) <artifacts>: for grouping code templates by development language; (x) <artifact>: for specifying a particular code template for code generation in a particular language serving a particular authentication function; (xi) <authentication>: for collectively specifying identifiers pertaining to generating authentication code under different contexts; (xii) <authenticator>: for collectively specifying details as to various authentication mechanisms; (xiii) <http-basic>: for specifying details as to HTTP Basic authentication; (xiv) <signed-url>: for specifying details as to Signed URL authentication; (xv) <session-key>: for specifying details as to Session Key authentication; (xvi) <api-key>: for specifying details as to API Key authentication; (xvii)

\<custom\>: for specifying details as to a customized authentication mechanism; (xviii) \<desktop\>, \<web\>: for specifying identifiers unique to particular authentication functions but differentiable depending on the environment.

The following is an example of an authentication schema in accordance with one or more embodiments of the invention.

The example is not intended to limit the scope of the invention.

EXAMPLE 2

Authentication Schema

```
<?xml version="1.0" encoding="UTF-8"?>
<xsd:schema xmlns:xsd="http://www.w3.org/2001/XMLSchema"
targetNamespace="http://xml.netbeans.org/websvc/saas/services/1.0"
       xmlns:saas="http://xml.netbeans.org/websvc/saas/services/1.0"
       elementFormDefault="qualified">
   <xsd:annotation>
      <xsd:documentation>
        [...]
      </xsd:documentation>
   </xsd:annotation>
   <xsd:element name="saas-services" type="saas:SaasServices"/>
   <xsd:element name="saas-metadata" type="saas:SaasMetadata"/>
   <xsd:element name="group" type="saas:Group"/>
   <xsd:complexType name="SaasServices">
      <xsd:sequence>
         <xsd:element name="description">
            <xsd:simpleType>
               <xsd:restriction base="xsd:string"/>
            </xsd:simpleType>
         </xsd:element>
         <xsd:element name="display-name" minOccurs="1" maxOccurs="1" type="xsd:string"/>
         <xsd:element ref="saas:saas-metadata" minOccurs="0" maxOccurs="1"/>
         <xsd:element name="header" minOccurs="0" maxOccurs="1">
            <xsd:complexType>
               <xsd:sequence>
                  <xsd:element name="params" type="saas:Params" minOccurs="0" maxOccurs="1"/>
               </xsd:sequence>
            </xsd:complexType>
         </xsd:element>
         <xsd:element name="methods" minOccurs="0" type="saas:Methods"/>
      </xsd:sequence>
      <xsd:attribute name="type" type="xsd:string" use="required"/>
      <xsd:attribute name="url" type="xsd:string" use="optional"/>
      <xsd:attribute name="api-doc" type="xsd:string" use="required"/>
   </xsd:complexType>
   <xsd:complexType name="SaasMetadata">
      <xsd:sequence>
         <xsd:element name="localizing-bundle" type="xsd:string" minOccurs="0" maxOccurs="1"/>
         <xsd:element ref="saas:group" minOccurs="1" maxOccurs="1"/>
         <xsd:element name="code-gen" minOccurs="0">
            <xsd:complexType>
               <xsd:sequence>
                  <xsd:element name="artifacts" type="saas:Artifacts" minOccurs="0" maxOccurs="unbounded"/>
               </xsd:sequence>
               <xsd:attribute name="packageName" type="xsd:string" use="optional"/>
            </xsd:complexType>
         </xsd:element>
         <xsd:element name="authentication" minOccurs="0" maxOccurs="1">
            <xsd:complexType>
               <xsd:sequence>
                  <xsd:element name="authenticator" minOccurs="0" maxOccurs="unbounded">
                     <xsd:complexType>
                        <xsd:complexContent>
                           <xsd:extension base="saas:Authenticator">
                              <xsd:attribute name="name" type="xsd:string" use="required"/>
                           </xsd:extension>
                        </xsd:complexContent>
                     </xsd:complexType>
                  </xsd:element>
                  <xsd:choice>
                     <xsd:element name="http-basic">
                        <xsd:complexType>
                           <xsd:sequence>
                              <xsd:element name="authenticator" type="saas:Authenticator" minOccurs="1" maxOccurs="1"/>
                           </xsd:sequence>
                           <xsd:attribute name="username" type="xsd:string" use="required"/>
                           <xsd:attribute name="password" type="xsd:string" use="required"/>
                        </xsd:complexType>
```

-continued

```
            </xsd:element>
            <xsd:element name="api-key">
              <xsd:complexType>
                <xsd:attribute name="id" type="xsd:string"/>
              </xsd:complexType>
            </xsd:element>
            <xsd:element name="signed-url" minOccurs="0" maxOccurs="unbounded">
              <xsd:complexType>
                <xsd:sequence>
                  <xsd:element name="sign" type="saas:Sign" minOccurs="0" maxOccurs="1"/>
                  <xsd:element name="authenticator" type="saas:Authenticator" minOccurs="0" maxOccurs="1"/>
                </xsd:sequence>
                <xsd:attribute name="sig-id" type="xsd:string" use="required"/>
                <xsd:attribute name="id" type="xsd:string" use="optional"/>
              </xsd:complexType>
            </xsd:element>
            <xsd:element name="session-key" minOccurs="0" maxOccurs="unbounded">
              <xsd:complexType>
                <xsd:sequence>
                  <xsd:element name="sign" type="saas:Sign" minOccurs="1" maxOccurs="1"/>
                  <xsd:element name="authenticator" type="saas:Authenticator" minOccurs="1" maxOccurs="1"/>
                </xsd:sequence>
                <xsd:attribute name="session-id" type="xsd:string" use="required"/>
                <xsd:attribute name="api-id" type="xsd:string" use="required"/>
                <xsd:attribute name="sig-id" type="xsd:string" use="required"/>
              </xsd:complexType>
            </xsd:element>
            <xsd:element name="custom"/>
          </xsd:choice>
        </xsd:sequence>
        <xsd:attribute name="profile" type="xsd:string" use="optional"/>
      </xsd:complexType>
    </xsd:element>
  </xsd:sequence>
</xsd:complexType>
<xsd:complexType name="Authenticator">
  <xsd:choice>
    <xsd:element name="use-templates" type="saas:UseTemplates" minOccurs="0" maxOccurs="1"/>
    <xsd:element name="use-generator" type="saas:UseGenerator" minOccurs="0" maxOccurs="1"/>
  </xsd:choice>
  <xsd:attribute name="xref" type="xsd:string" use="optional"/>
</xsd:complexType>
<xsd:complexType name="UseTemplates">
  <xsd:sequence>
    <xsd:element name="desktop" type="saas:TemplateType" minOccurs="0" maxOccurs="1"/>
    <xsd:element name="web" type="saas:TemplateType" minOccurs="0" maxOccurs="1"/>
  </xsd:sequence>
</xsd:complexType>
<xsd:complexType name="TemplateType">
  <xsd:sequence>
    <xsd:element name="template" minOccurs="0" maxOccurs="unbounded">
      <xsd:complexType>
        <xsd:attribute name="type" type="xsd:string"/>
        <xsd:attribute name="href" type="xsd:string"/>
      </xsd:complexType>
    </xsd:element>
  </xsd:sequence>
</xsd:complexType>
<xsd:complexType name="UseGenerator">
  <xsd:sequence>
    <xsd:element name="login" minOccurs="0" maxOccurs="1">
      <xsd:complexType>
        <xsd:sequence>
          <xsd:element name="sign" type="saas:Sign" minOccurs="0" maxOccurs="1"/>
          <xsd:element name="method" type="saas:Method" minOccurs="1" maxOccurs="1"/>
        </xsd:sequence>
      </xsd:complexType>
    </xsd:element>
    <xsd:element name="token" minOccurs="0" maxOccurs="1">
      <xsd:complexType>
        <xsd:sequence>
```

```
            <xsd:element name="sign" type="saas:Sign" minOccurs="0" maxOccurs="1"/>
            <xsd:element name="method" type="saas:Method" minOccurs="1" maxOccurs="1"/>
          </xsd:sequence>
          <xsd:attribute name="id" type="xsd:string" use="required"/>
        </xsd:complexType>
      </xsd:element>
      <xsd:element name="logout" minOccurs="0" maxOccurs="1">
        <xsd:complexType>
          <xsd:sequence>
            <xsd:element name="sign" type="saas:Sign" minOccurs="0" maxOccurs="1"/>
            <xsd:element name="method" type="saas:Method" minOccurs="1" maxOccurs="1"/>
          </xsd:sequence>
        </xsd:complexType>
      </xsd:element>
    </xsd:sequence>
  </xsd:complexType>
  <xsd:complexType name="Artifacts">
    <xsd:sequence>
      <xsd:element name="artifact" type="saas:Artifact" minOccurs="0" maxOccurs="unbounded"/>
    </xsd:sequence>
    <xsd:attribute name="targets" type="xsd:string" use="optional"/>
    <xsd:attribute name="profile" type="xsd:string" use="optional"/>
  </xsd:complexType>
  <xsd:complexType name="Artifact">
    <xsd:attribute name="id" type="xsd:string"/>
    <xsd:attribute name="type" type="xsd:string" default="library"/>
    <xsd:attribute name="url" type="xsd:string" default="location of jar"/>
    <xsd:attribute name="requires" type="xsd:string" default="id of another artifact"/>
  </xsd:complexType>
  <xsd:complexType name="Methods">
    <xsd:sequence>
      <xsd:element name="method" type="saas:Method" minOccurs="0" maxOccurs="unbounded"/>
    </xsd:sequence>
  </xsd:complexType>
  <xsd:complexType name="Method">
    <xsd:annotation>
      <xsd:documentation>
        [...]
      </xsd:documentation>
    </xsd:annotation>
    <xsd:sequence>
      <xsd:element name="documentation" type="xsd:string" minOccurs="0" maxOccurs="1"/>
      <xsd:element name="input" minOccurs="0" maxOccurs="1">
        <xsd:annotation>
          <xsd:documentation>
            [...]
          </xsd:documentation>
        </xsd:annotation>
        <xsd:complexType>
          <xsd:sequence>
            <xsd:element name="params" type="saas:Params" minOccurs="0" maxOccurs="1"/>
          </xsd:sequence>
        </xsd:complexType>
      </xsd:element>
      <xsd:element name="output" minOccurs="0" maxOccurs="1">
        <xsd:annotation>
          <xsd:documentation>
            [...]
          </xsd:documentation>
        </xsd:annotation>
        <xsd:complexType>
          <xsd:sequence>
            <xsd:element name="media" minOccurs="0" maxOccurs="1">
              <xsd:complexType>
                <xsd:attribute name="type" type="xsd:string" use="required"/>
              </xsd:complexType>
            </xsd:element>
          </xsd:sequence>
        </xsd:complexType>
      </xsd:element>
    </xsd:sequence>
    <xsd:attribute name="id" type="xsd:string" use="optional"/>
    <xsd:attribute name="name" type="xsd:string" use="required">
      <xsd:annotation>
```

-continued

```
        <xsd:documentation>
            [...]
        </xsd:documentation>
      </xsd:annotation>
    </xsd:attribute>
    <xsd:attribute name="href" type="xsd:string">
      <xsd:annotation>
        <xsd:documentation>
            [...]
        </xsd:documentation>
      </xsd:annotation>
    </xsd:attribute>
    <xsd:attribute name="serviceName" type="xsd:string"/>
    <xsd:attribute name="portName" type="xsd:string"/>
    <xsd:attribute name="operationName" type="xsd:string"/>
  </xsd:complexType>
  <xsd:complexType name="Params">
    <xsd:sequence>
      <xsd:element name="param" minOccurs="0" maxOccurs="unbounded">
        <xsd:complexType>
          <xsd:sequence minOccurs="0" maxOccurs="1">
            <xsd:element name="set">
              <xsd:complexType>
                <xsd:sequence>
                  <xsd:element name="value" minOccurs="1" maxOccurs="unbounded"/>
                </xsd:sequence>
              </xsd:complexType>
            </xsd:element>
          </xsd:sequence>
          <xsd:attribute name="id" type="xsd:string" use="optional"/>
          <xsd:attribute name="name" type="xsd:string" use="required"/>
          <xsd:attribute name="type" type="xsd:string" use="required"/>
          <xsd:attribute name="default" type="xsd:string" use="optional"/>
          <xsd:attribute name="fixed" type="xsd:string"/>
          <xsd:attribute name="required" type="xsd:boolean" use="optional"/>
        </xsd:complexType>
      </xsd:element>
    </xsd:sequence>
  </xsd:complexType>
  <xsd:complexType name="Group">
    <xsd:sequence minOccurs="0">
      <xsd:element name="group" type="saas:Group" minOccurs="0" maxOccurs="unbounded"></xsd:element>
    </xsd:sequence>
    <xsd:attribute name="name" type="xsd:string"/>
  </xsd:complexType>
  <xsd:complexType name="Sign">
    <xsd:sequence>
      <xsd:element name="params" type="saas:Params" minOccurs="0" maxOccurs="1"/>
    </xsd:sequence>
    <xsd:attribute name="id" type="xsd:string" use="required"/>
  </xsd:complexType>
  <xsd:complexType name="Prompt">
    <xsd:attribute name="url" type="xsd:string"/>
  </xsd:complexType>
</xsd:schema>
```

In one or more embodiments of the invention, an authentication scheme associated with a particular web service specifies details necessary for properly authenticating interactions between that web service and a client application. In one or more embodiments of the invention, the authentication scheme is defined using the authentication schema. In one or more embodiments of the invention, the authentication scheme is implemented using XML. The following is an example of an authentication scheme in accordance with one or more embodiments of the invention. This particular authentication scheme is an example and not intended to limit the scope of the invention.

EXAMPLE 3

Authentication Scheme

```
<saas-services xmlns="http://xml.netbeans.org/websvc/saas/services/1.0"
type="http://research.sun.com/wadl/2006/10"
api-doc="http://del.icio.us/help/api/"
url="org/netbeans/modules/websvc/saas/services/delicious/resources/
DeliciousWadl.xml">
    <description>Bookmarking Service</description>
    <display-name>Bookmarking Service</display-name>
    <saas-metadata>
```

```
<localizing-bundle>
org.netbeans.modules.websvc.saas.services.bookstore.Bundle</localizing-bundle>
    <group name="Delicious"/>
    <code-gen>
        <artifacts targets="java,servlet,resource,jsp"
profile="Templates/SaaSServices/httpbasic.properties">
            <artifact id="HttpBasicAuthenticatorDesktop" type="template"
url="Templates/SaaSServices/HttpBasicAuthenticatorDesktop.java"/>
            <artifact id="HttpBasicAuthenticator" type="template"
url="Templates/SaaSServices/HttpBasicAuthenticator.java"/>
            <artifact id="HttpBasicAuthenticatorLogin" type="template"
url="Templates/SaaSServices/HttpBasicLogin.java"/>
            <artifact id="HttpBasicAuthenticatorCallback" type="template"
url="Templates/SaaSServices/HttpBasicCallback.java"/>
        </artifacts>
        <artifacts targets="php" profile="Templates/SaaSServices/httpbasic.php">
            <artifact id="HttpBasicAuthenticator" type="template"
url="Templates/SaaSServices/HttpBasicAuthenticator.php"/>
            <artifact id="HttpBasicAuthenticatorLogin" type="template"
url="Templates/SaaSServices/HttpBasicLogin.php"/>
            <artifact id="HttpBasicAuthenticatorCallback" type="template"
url="Templates/SaaSServices/HttpBasicCallback.php"/>
        </artifacts>
    </code-gen>
    <authentication>
        <http-basic username="username" password="password">
            <authenticator>
                <use-templates>
                    <desktop>
                        <template type="auth" href="HttpBasicAuthenticatorDesktop"/>
                    </desktop>
                    <web>
                        <template type="auth" href="HttpBasicAuthenticator"/>
                        <template type="login" href="HttpBasicAuthenticatorLogin"/>
                        <template type="callback" href="HttpBasicAuthenticatorCallback"/>
                    </web>
                </use-templates>
            </authenticator>
        </http-basic>
    </authentication>
  </saas-metadata>
  <methods/>
</saas-services>
```

The authentication scheme of Example 3 provides metadata in support of authenticating a bookmarking web service, as indicated by the <description> and <display-name> elements. The service is associated with the Delicious group of services, as indicated by the <group> element.

In Example 3, the authentication mechanism used is HTTP Basic, as indicated by the <http-basic> element nested within the <authentication> element; in particular, <desktop> and <web> elements are further used to provide references to different artifact identifiers for different code templates based on the computing context in which the authentication will be performed. This results in the specification of a HTTPBasicAuthenticatorDesktop artifact identifier disclosed using a <template> element for the desktop context, in addition to HTTPBasicAuthenticator, HTTPBasicAuthenticatorLogin, and HTTPBasicAuthenticatorCallback artifact identifiers similarly disclosed for the web context.

These artifact identifiers, once obtained, are used to obtain code templates with which they correspond. By matching an artifact identifier to the 'id' attribute of an <artifact> element, the file path for the code template is obtained through the 'url' attribute of that <artifact> element. Because <artifact> elements are nested under a language-specific <artifacts> element according to the language their associated templates support, there may be an <artifact> element specified for each supported code generation language in the interest of providing multi-language support. For example, the HTTPBasicAuthenticator artifact identifier in Example 3 corresponds with an <artifact> element nested beneath <artifacts> elements for both java and php. Through the proper use of <artifact> and <artifacts> elements, code generation support can be extended across multiple languages.

An example of authentication code generated in one or more embodiments of the invention follows. This generated code is an example and not intended to limit the scope of the invention.

EXAMPLE 4

Generated Authentication Code

```
public class MyBookStoreServiceAuthenticator extends Authenticator
{
    private static String username;
    private static String password;
    private static final String PROP_FILE =
MyBookStoreServiceAuthenticator.class.getSimpleName( ).
toLowerCase( ) + ".properties";
    static {
        try
        {
            Properties props = new Properties( );
props.load(MyBookStoreServiceAuthenticator.class.-
getResourceAsStream(PROP_FILE));
            username = props.getProperty("username");
```

-continued

```
        password = props.getProperty("password");
        }
        catch (IOException ex)
        {
Logger.getLogger(MyBookStoreServiceAuthenticator.class.-
getName( )).log(Level.SEVERE, null, ex);
        }
    }
    private static MyBookStoreServiceAuthenticator singleton = new
    MyBookStoreServiceAuthenticator( );
    public static void login( ) throws IOException
    {
        Authenticator.setDefault(singleton);
    }
    private MyBookStoreServiceAuthenticator( )
    { }
}
```

The generated Java™ authentication code in Example 4 is in support of a web service defined by the service definition provided in Example 1 and using the authentication scheme provided in Example 3 (Java™ is a trademark of Sun Microsystems, Inc. of Santa Clara, Calif.). In one or more embodiments of the invention, a developer wanting to consume the web service would invoke MyBookStoreServiceAuthenticator.login( ) and the generated authentication code would handle the task of authenticating in support of the invoked resource method; as a result, the developer is spared the task of creating the authentication support themselves.

Returning to FIG. 1, the IDE (114) is further configured to receive a selected resource method as input from a user (124). In facilitating the processing of the service definition (106), the authentication scheme (104), and the user-selected resource method, the IDE includes the following functional components: a graphical user interface (116), a model builder (118); a parser (120); and a code generator (122).

In one or more embodiments of the invention, the graphical user interface (116), or GUI, is configured to receive a resource method selection from a user. In one or more embodiments of the invention, the GUI (116) is a feature of an IDE (114) and comprises a menu displaying a listing of resources and corresponding resource methods associated with those resources. In one or more embodiments of the invention, the GUI (116) and the menu therein are configured to allow a user to drag and drop a resource method from the menu into a workspace in the IDE (114).

In one or more embodiments of the invention, the parser (120) is configured to receive a service definition (106). By parsing elements of the service definition (106), the parser (120) retrieves information specifying resources and resource methods embodying the corresponding web service (102). In one or more embodiments of the invention, the parser (120) is an XML parser. Further, in one or more embodiments of the invention, the parser (120) is contained in the model builder (118).

In one or more embodiments of the invention, the model builder (118) is configured to build a resource model from a service definition (106). A resource model is a representation of the resources and associated resource methods, as defined by the service definition (106). In one or more embodiments of the invention, the model builder (118) is configured to use a parser (120) to read the service definition (106). In one or more embodiments of the invention, the parser is a component separate from the model builder (118), while in one or more other embodiments of the invention the parser (120) is a built-in component of the model builder (118). In one or more embodiments of the invention, the model builder (118) is configured to build a resource model in memory.

In one or more embodiments of the invention, the code generator (122) is configured to generate authentication code using the resource model and an authentication scheme (104). The code generator (122) determines an authentication mechanism for a user-selected resource method, determines a development language in which to generate the authentication code, selects an authentication code template using the development language and authentication mechanism, and generates authentication code in support of invoking the resource method.

FIGS. 2, 3, 5, and 6 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

Figure 2:
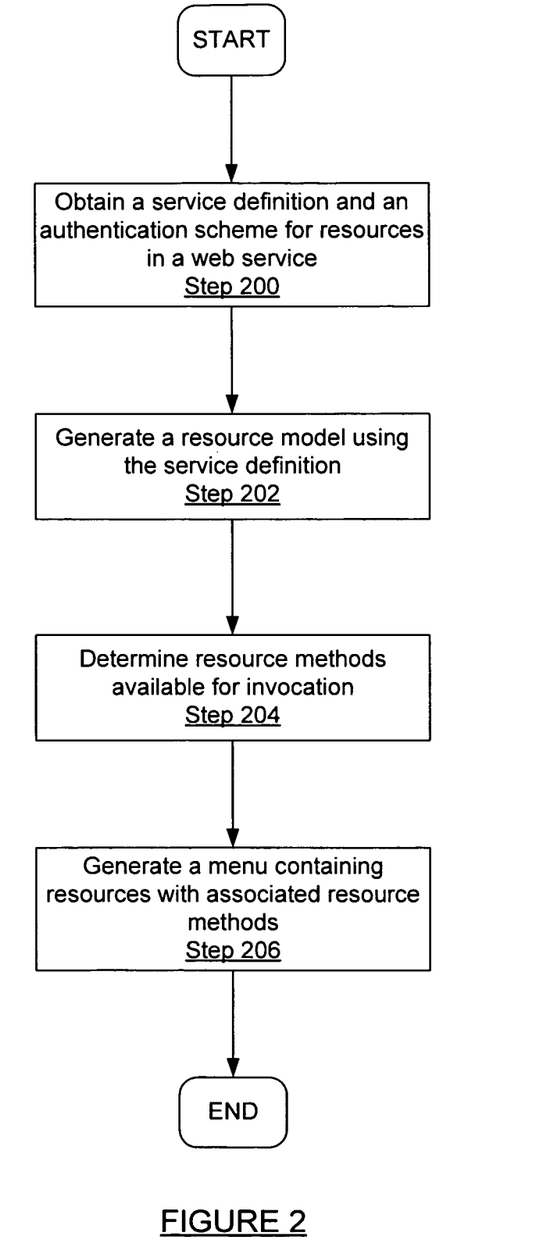
FIG. 2 shows a flowchart in accordance with one or more embodiments of the invention.

FIG. 2 shows a flowchart in accordance with one or more embodiments of the invention. The process in FIG. 2 may be used, for example, to process a service definition to generate a resource model and a resource menu.

In Step 200, a service definition and an authentication scheme for resources in a web service are obtained. In one or more embodiments of the invention, the service definition and authentication scheme for a particular web service are received by the IDE. In Step 202, a resource model using the service definition is generated. In one or more embodiments of the invention, the resource model is an in-memory representation of the resources and associated resource methods, as specified by the service definition for the web service.

In Step 204, the availability of resource methods for invocation are determined.

In one or more embodiments of the invention, the authentication scheme defines which availability resource methods are available for invocation. For instance, in one or more embodiments of the invention where the authentication scheme is implemented using XML, the resource methods for display are specified using the <methods> element (nested within the <saas-services> element). Because only resource methods which are displayable are then menu-selectable and hence available for invocation, the authentication scheme can limit which resource methods are available for invocation by a user. Alternatively, in one or more other embodiments of the invention where the authentication scheme does not specify resource methods for display as described above, all resource methods specified by the service definition are displayed and thereby available to the user for invocation.

In Step 206, a menu is generated containing resources with their associated resource methods. Further, the menu enables a user to select a resource method for invocation. In one or more embodiments of the invention, the menu is a feature of an IDE GUI. In one or more embodiments of the invention, the menu allows a user to drag and drop a resource method from the menu into the user's IDE workspace. Pursuant to the discussion above, in one or more embodiments of the invention, the displayed resource methods may be limited in accordance with what is specified by the authentication scheme.

Figure 3:
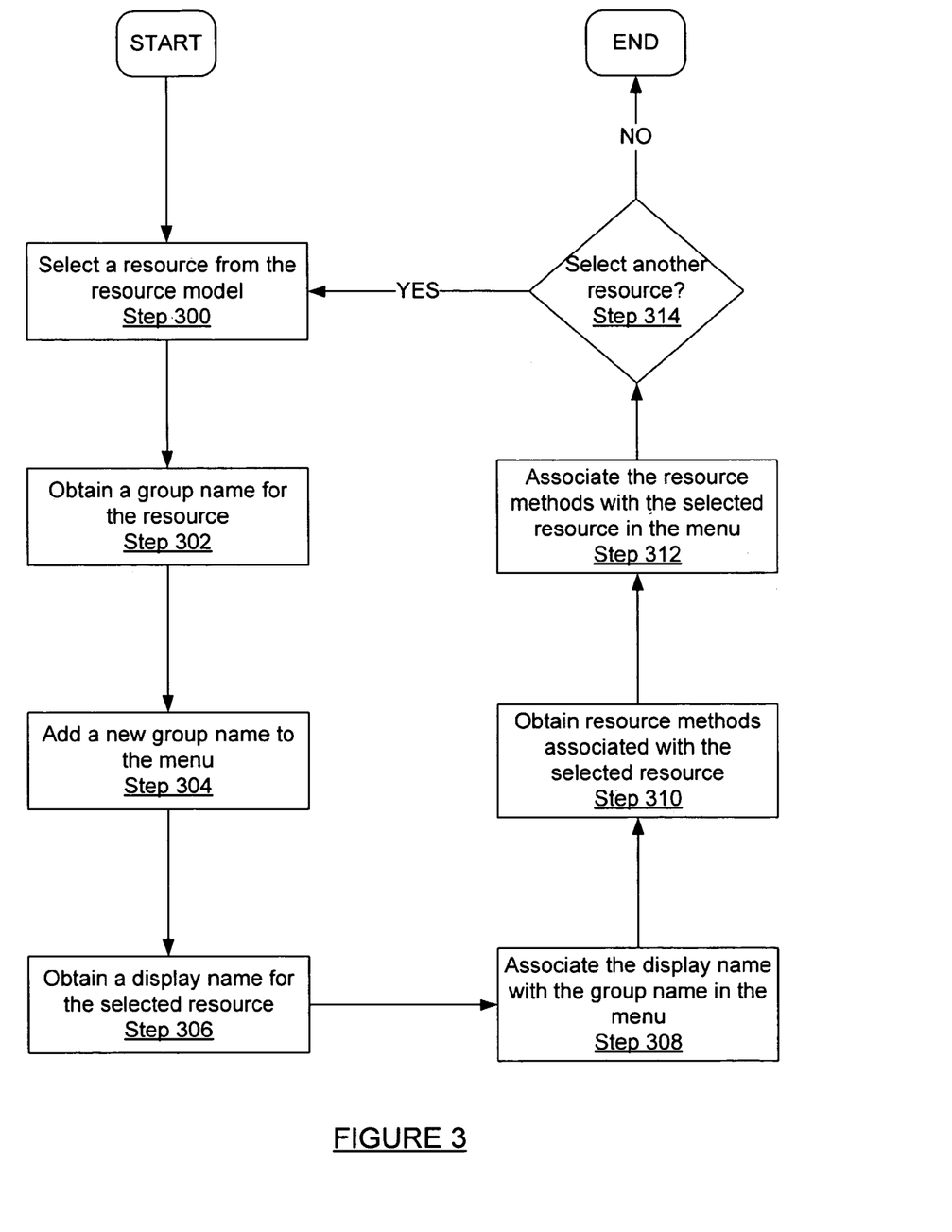
FIG. 3 shows a flowchart in accordance with one or more embodiments of the invention.

FIG. 3 shows a flowchart in accordance with one or more embodiments of the invention. The process in FIG. 3 may be used, for example, to generate a menu displaying resources with their associated resource methods.

In Step 300, a resource is selected from the resource model. In one or more embodiments of the invention, resources will be iteratively selected from the resource model and processed for purposes of adding them to the menu. The iterative nature of this processing is further reflected in Step 314 where, after having processed one resource from the resource model, the cycle repeats until the supply of unprocessed resources has been exhausted.

In Step 302, a group name associated with the resource is obtained. The group name is used for categorically grouping related web service resources together. In one or more embodiments of the invention where the authentication scheme is implemented using XML, the group name is specified using the <group> element, nested within the <saas-metadata> element, in the authentication scheme. In Step 304, the group name is added to the menu. Each group name is added only once to the menu; therefore performing the 'add' of the group name to the menu in Step 304 is conditioned upon whether this group name would be a new and non-redundant addition.

In Step 306, a displayable name for the selected resource is obtained. In one or more embodiments of the invention, the display name is a display-friendly textual representation of a resource. In one or more embodiments of the invention where the authentication scheme is implemented using XML, the display name is specified using the <display-name> element, nested within the <saas-metadata> element, in the authentication scheme. In Step 308, the displayable name for the selected resource is used to associate the resource with the group name in the menu.

In Step 310, resource methods associated with the selected resource are obtained. The obtained resource methods are display in tandem with the resource display name in the menu that corresponds with the selected resource. In embodiments of the invention where the authentication scheme is implemented using XML, the resource methods to be displayed are specified using the <methods> element, nested within the <saas-metadata> element, in the authentication scheme. In one or more other embodiments of the invention where the authentication scheme is silent as to which resource methods are to be displayed for a particular resource, all the resource methods associated with the selected resource in the resource model, as originally obtained from the service definition, are used as a default. In Step 312, the obtained resource methods are associated with the resource in the menu.

In Step 314, a next resource is selected from the resource model. If every resource in the resource model has been processed for purposes of generating the resource menu, then the process in FIG. 3 is complete.

Figure 4:
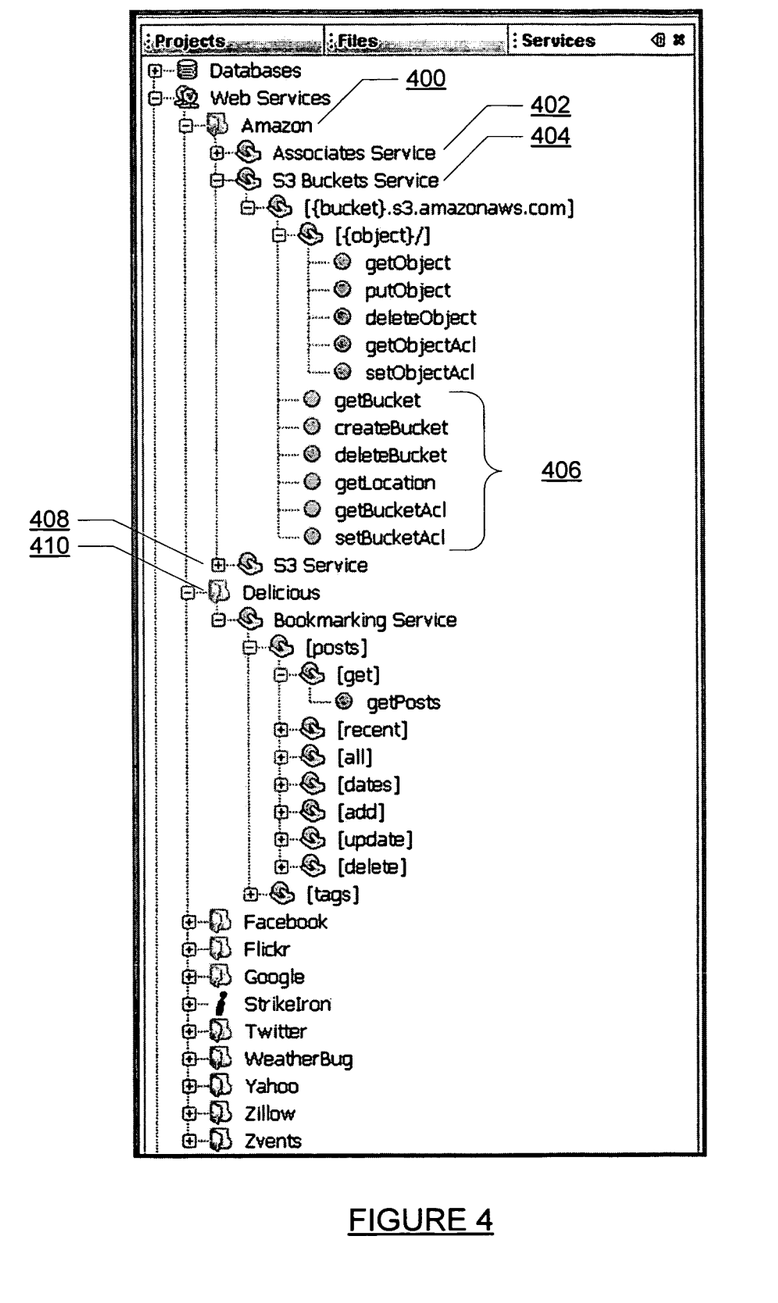
FIG. 4 shows a screenshot in accordance with one or more embodiments of the invention.

FIG. 4 shows a menu in accordance with one or more embodiments of the invention. The menu displays a plurality of web service resources and the available resource methods associated with each of the plurality of resources. Further, the menu allows a user to select a resource method for invocation. In one or more embodiments of the invention where the menu is a feature of the IDE GUI, a user is able to drag and drop their selection from the menu into a workspace in the IDE. FIG. 4 shows an example of a menu that has been generated using the process described by FIG. 3; for instance, FIG. 4 shows group names (400 and 410), a display name for a resource (402, 404, and 408), and resource methods (406) for a particular resource (404).

Figure 5:
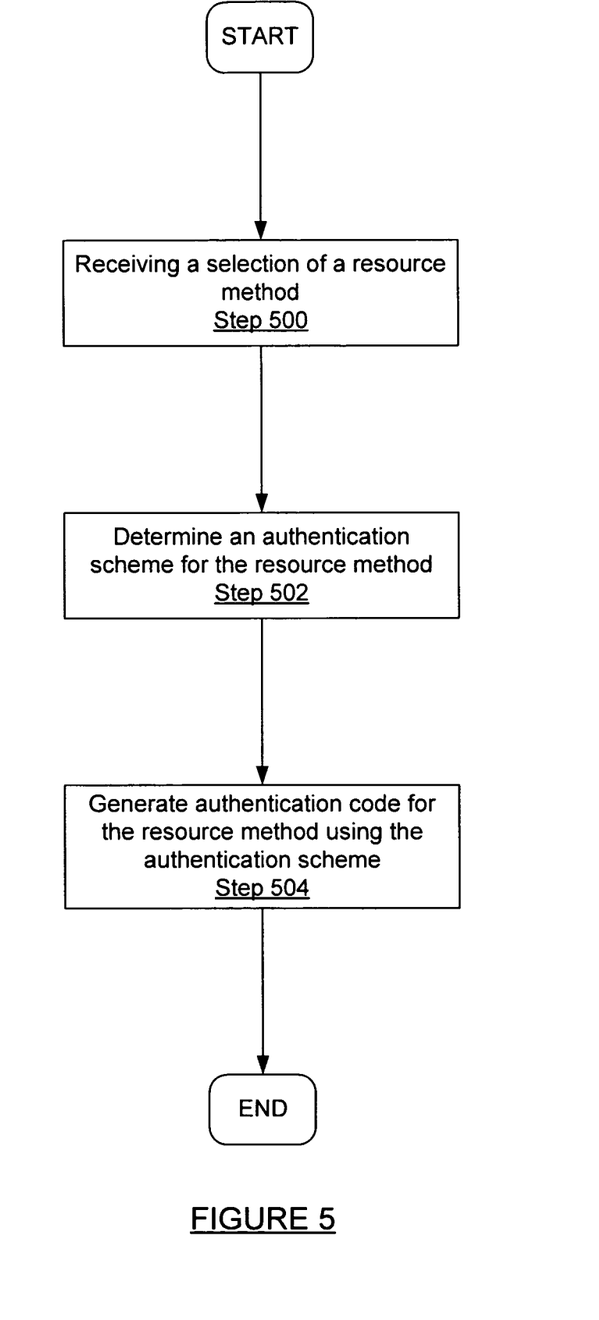
FIG. 5 shows a flowchart in accordance with one or more embodiments of the invention.

FIG. 5 shows a flowchart in accordance with one or more embodiments of the invention. The process in FIG. 5 may be used, for example, to generate authentication code for a selected web service resource method.

In Step 500, a selection of a resource method is received. In one or more embodiments of the invention, the selection of a resource method is made by a user through an IDE GUI menu. In one or more embodiments of the invention, the selection of a resource method is made when the user performs a drag and drop action from a menu into an IDE workspace.

Figure 6:
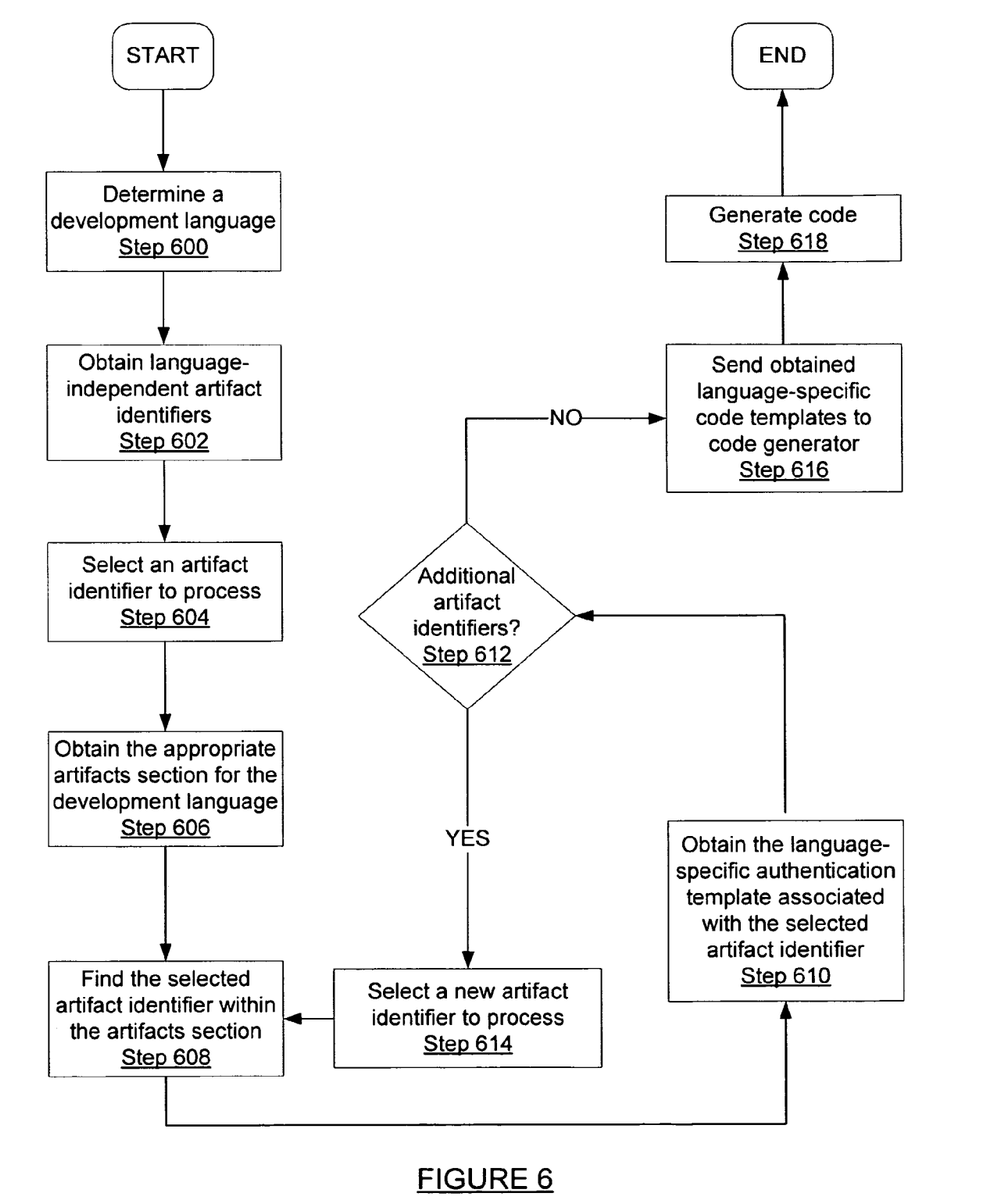
FIG. 6 shows a flowchart in accordance with one or more embodiments of the invention.

In Step 502, an authentication scheme for the selected resource method is determined. FIG. 6, discussed below, shows a method for selecting an authentication scheme for a resource method in accordance with one or more embodiments of the invention.

In Step 504, authentication code is generated for the selected resource method using the authentication scheme. In one or more embodiments of the invention, a code generator is configured to generate authentication code in a particular development language using code templates.

FIG. 6 shows a flowchart in accordance with one or more embodiments of the invention. The process in FIG. 6 may be used, for example, to generate authentication code using a code template in a particular development language.

In Step 600, a development language used for code generation purposes is determined. In one or more embodiments of the invention, this is an input received by the IDE. In one or more embodiments of the invention, this is an input specified by the user.

In Step 602, language-independent artifact identifiers are obtained. In one or more embodiments of the invention, each artifact identifier is specific to an authentication function. Further, in one or more embodiments of the invention, an artifact identifier is associated with a plurality of language-specific code templates, which all support the common authentication mechanism related to that artifact identifier across various languages. In one or more embodiments of the invention where the authentication scheme is implemented using XML, these artifact identifiers are broadly specified using the <use-templates> element, nested within the <authentication> and <authenticator> elements. Within the <use-templates> element, there may be further nested elements, such as <desktop> and <web>, which allow further differentiation for a finer grain of template selection based on the context against which the authentication will occur.

Further regarding Step 602, in one or more embodiments of the invention, there may be more than one artifact identifier specified for a particular authentication mechanism. For instance, a particularly complex mechanism may require separate templates in support of carrying out functionally different parts of the authentication mechanism. In such cases, each artifact identifier will iteratively processed to obtain a corresponding code template until the supply of unprocessed artifact identifiers is exhausted for the context.

In Step 604, a first language-independent artifact identifier is selected for processing.

In Step 606, an artifacts section corresponding with the development language is obtained. Artifact sections allow for the categorization of code templates according to language. In one or more embodiments of the invention, an artifact identifier corresponding with a particular authentication context will be commonly found in different artifacts sections for the purposes of providing authentication support across different development languages. In one or more embodiments of the invention where the authentication scheme is implemented using XML, an artifacts section may be specified using the <artifacts> element, nested within the <saas-metadata> and <code-gen> elements; under these embodiments, the artifacts sections are language-specific and distinguishable by the 'targets' attribute.

In Step 608, the selected artifact identifier in the obtained artifacts section is found. In Step 610, the artifact identifier is used to obtain a corresponding language-specific template supporting the relevant authentication mechanism. In one or more embodiments of the invention where the authentication scheme is implemented using XML, an artifact section may include a number of individual templates specifications. Each template specification uses the <artifact> element, including an 'id' and a 'url' attribute. The language-specific template properly corresponding with the authentication mechanism is found by matching the selected artifact identifier with the 'id' attributes of the template specifications. In one or more embodiments of the invention, once a matching <artifact> is found, the 'url' attribute for that <artifact> specifies the location of the template.

In Step 612, a determination is made whether any of the obtained artifact identifiers from Step 602 remain unprocessed. If such is the case, in Step 614, a new artifact identifier is selected for processing and the process repeats to obtain other code templates until the supply of unprocessed artifact identifiers is exhausted.

In Step 616, the collection of language-specific templates are routed into a code generator. In Step 618, the code generator uses the language-specific templates to create authenticate code in support of the authentication mechanism required for invoking the user-selected resource method.

EXAMPLE

An example is provided in illustration of one or more embodiments of the invention. The example is not intended to limit the scope of the invention.

A community leader in Smalltown, USA decides to spearhead an initiative to foster greater interaction with people in other nearby towns within the county. In talking with people from these other towns, he comes to realize that he is not alone as others share his vision. To encourage a closer sense of community, he proposes to build a website which will strive to provide a forum for county-wide events. The website content will be tied to an event repository, allowing users to browse, create, and update event listings. In the time following these events, users will be able to view event-related photos through a tie-in to Flickr™ Services. (Flickr is trademark of Yahoo! Inc. of Sunnyvale, Calif.).

A challenge now facing this developer is getting up to speed on the authentication mechanisms required for programmatically interacting with the Flickr™ web service for the retrieval of photo content. At this point, he only intends on using Flickr™ to expand on the event website's functionality; however, if the website is well-received, there may be further development plans—in which case there may be more work involved in authenticating newly added web services.

As its content is user-generated, the authentication requirements for Flickr™ are as follows. It requires the user to make an initial request using a unique key, a permission level (read, write, delete), and a hash function-generated signature. Upon receiving the request, the content owner can opt to approve your request in which case a unique authorization character string is passed back to the requesting party. This character string, along with the unique key and a shared secret, are run through a hash function to generate a signature, which along with the other above-mentioned parameters are used to obtain a token. Subsequent calls requesting access to content require both the token and the generated signature.

One way to meet the challenge of satisfying the requirements of various authentication mechanisms required by various web services is if the web services themselves supply metadata aiding in the generation of the authentication code necessary for interacting with them. In accordance with one or more embodiments of this invention, Flickr™ can create service definitions specifying the resources and associated resource methods operative in its web service. If these service definitions are in a format recognizable by an IDE, a representative resource model may be generated and used to provide an IDE user with a menu of resources. Further, metadata detailing the authentication mechanisms required by the web service may be specified in authentication schemes. If these authentication schemes are in a format recognizable by the IDE and compliant with a general authentication schema supported by the IDE, code can be generated in support of authenticating interactions with the web service.

Once this authentication infrastructure is in place, the user needs only to ensure that their IDE has obtained the necessary service definitions and authentication schemes.

Having done that, the resources for the web service should be available to the user through a menu, allowing the user to invoke methods interacting with the web service by making a menu selection. Once the selection is made, authentication code in support of invoking the selected resource method is then automatically generated.

Returning to the example, to retrieve the pictures the developer invokes the 'getPublicPhotos' resource method of Flick™'s 'people' resource by dragging and dropping the resource method from the IDE menu into an IDE workspace. The function call to retrieve public photos from Flickr™ does not require client authentication and so no authentication code is generated in support of the resource method invocation. However once the photos of the mayor are retrieved, the developer wants to allow users to tag themselves in instances where they are also in the picture. In writing the event-handler function for tagging a retrieved photo, the developer similarly selects the 'addTags' resource method of Flickr™'s 'photos' resource by dragging and dropping the resource from the IDE menu into a GUI filespace pertaining to the event-handler function. Because tagging Flickr™ photos requires write permission, this function call requires client authentication and results in the generation of authentication code in support of the resource method invocation.

In this example, there is no perceivable difference to the application developer between invoking the resource method for tagging photos, that requires authentication, and the resource method for retrieving photos, which does not require authentication. Accordingly, this remains true regarding the interaction of resources belong to different web services quite possibly requiring different authentication mechanisms. Were the developer to add a new feature to the website that allows consumption of another web service, such as YouTube™, the developer would similarly be able to invoke resource methods in the same fashion as long as a schema-compliant authentication scheme and service definition for YouTube™ were available for processing by the user's IDE. (YouTube is trademark of Google, Inc. of Mountain View, Calif.) Regardless of the type of authentication mechanism required in interacting with the new web service, the support provided in generating authentication code spares the developer the cost and effort involved in acquainting himself with each new context.

Figure 7:
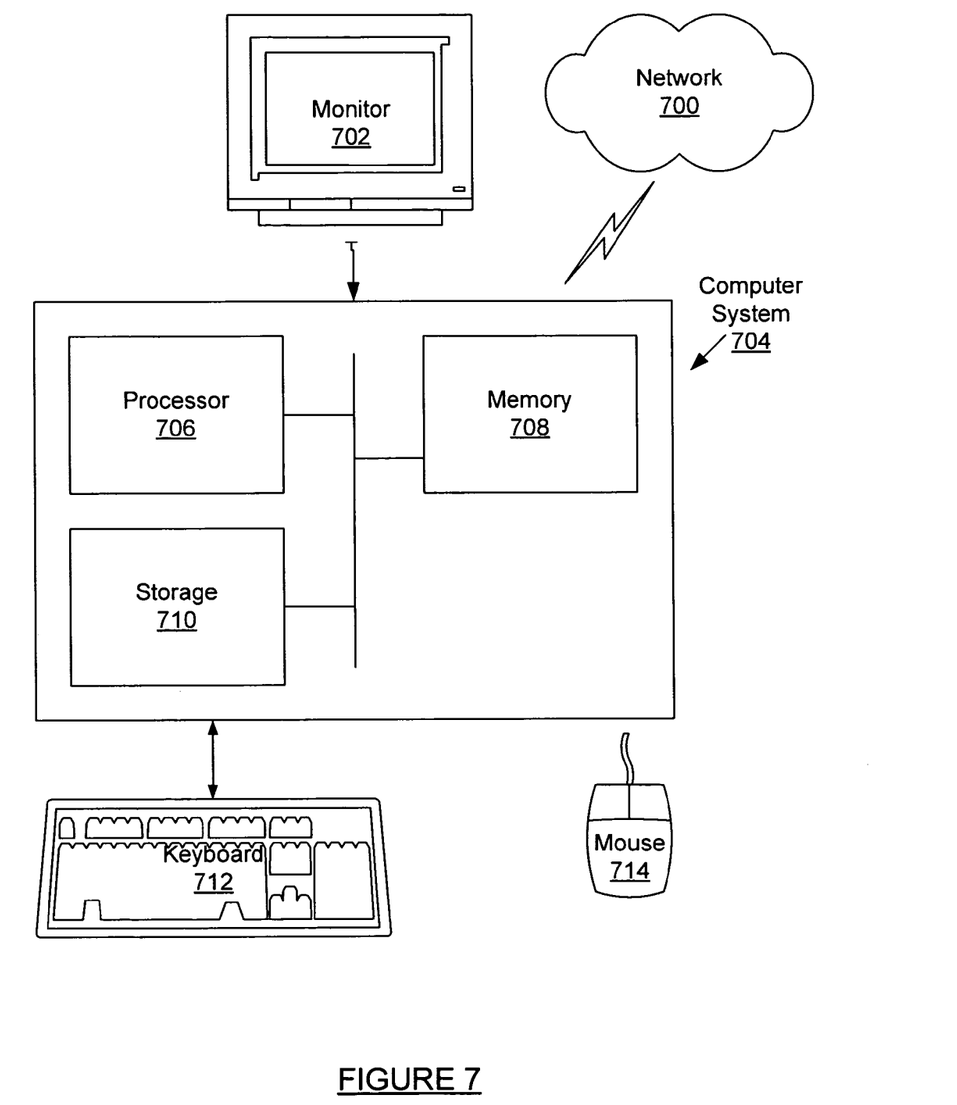
FIG. 7 shows a computer system in accordance with one or more embodiments of the invention.

Embodiments of the invention may be implemented on virtually any type of computer regardless of the platform being used. For example, as shown in FIG. 7, a computer system (704) includes one or more processor(s) (706), associated memory (708) (e.g., random access memory (RAM), cache memory, flash memory, etc.), a storage device (710) (e.g., a hard disk, an optical drive such as a compact disk drive or digital video disk (DVD) drive, a flash memory stick, etc.), and numerous other elements and functionalities typical of today's computers (not shown). The computer (704) may also include an input means, such as a keyboard (712), a mouse (714), or a microphone (not shown). Further, the computer (704) may include an output means, such as a monitor (702) (e.g., a liquid crystal display (LCD), a plasma display, or cathode ray tube (CRT) monitor). The computer system (704) may be connected to a network (700) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (704) includes at least the minimal processing, input, and/or output means necessary to practice embodiments of the invention.

Further, those skilled in the art will appreciate that one or more elements of the aforementioned computer system (704) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating authentication code for web service resources by an Integrated Development Environment (IDE), comprising:
    obtaining, by the IDE, metadata of a first web service;
    obtaining, by the IDE, a first service definition from the metadata, wherein the first service definition defines a plurality of resources associated with the first web service, and wherein at least one of the plurality of resources is associated with a first resource method;
    receiving, from a user of the IDE and by the IDE, a selection of the first resource method, wherein the first resource method defines a first method for interacting with a first resource of the plurality of resources associated with the first web service;
    determining, by the IDE, a first authentication scheme for the first resource method, wherein the first authentication scheme defines an authentication mechanism required during execution of the first resource method to enable interaction with the first resource; and
    determining, by the IDE, a development language for generating a first authentication code;
    selecting, by the IDE, a language-specific code template from a plurality of language-specific code templates listed in the first authentication scheme based on the development language, wherein selecting the language-specific code template comprises: obtaining an artifact identifier for an artifact from the first authentication scheme, wherein the artifact corresponds to an authentication mechanism defined in the first authentication scheme; and selecting the language-specific code template from the first authentication scheme using the artifact identifier and the development language; and
    generating, by the IDE and in response to the selection, a first authentication code for the first resource method using the language-specific code template,
    wherein the first authentication code enables the user of the IDE executing the first resource method to interact with the first resource.

2. The method of claim 1, further comprising:
    obtaining the first authentication scheme;
    generating a first resource model using the first service definition, wherein the first resource model comprises the plurality of resources, wherein each of the plurality of the resources is associated with a plurality of resource methods, and wherein the first resource method is one of the plurality of resource methods; and
    generating a menu comprising the plurality of resources in the first resource model, wherein each of the plurality of resources is presented with at least one of the plurality of resource methods.

3. The method of claim 2, wherein the first service definition is defined using Web Application Description Language (WADL).

4. The method of claim 1, further comprising:
    receiving a selection of a second resource method, wherein the second resource method defines a second method for interacting with a second resource associated with a second web service;
    determining a second authentication scheme for the second resource method, wherein the second authentication scheme defines an authentication mechanism required during execution of the second resource method to enable interaction with the second resource; and
    generating second authentication code for the second resource method using the second authentication scheme,
    wherein the second authentication code enables a user executing the second resource method to interact with the second resource,
    wherein the first authentication scheme and the second authentication scheme are defined using an authentication schema.

5. The method of claim 4, wherein the first authentication scheme, the second authentication scheme, and authentication schema are implemented using Extensible Markup Language (XML).

6. The method of claim 5, wherein the authentication schema comprises at least one tag from a group consisting of <saas-services>, <saas-metadata>, <description>, <display-name>, <header>, <params>, <methods>, <localizing-bundle>, <code-gen>, <artifacts>, <artifact>, <authentication>, <authenticator>, <http-basic>, <api-key>, <signed-url>, <session-key>, <custom>, <use-templates>, <desktop>, <web>, <template>, and <group>.

7. The method of claim 1, wherein the authentication mechanism is one selected from a group consisting of Application Programming Interface Key, Hypertext Transfer Protocol Basic, Signed Uniform Resource Locator, and Session Key.

8. A system, comprising:
    a processor;
    a output device;
    an Integrated Development Environment (IDE) executing on the processor to:
        obtain metadata of a first web service;
        obtain a first service definition from the metadata, wherein the first service definition defines a plurality of resources associated with the first web service, and wherein at least one of the plurality of resources is associated with a first resource method;

receive, from a user of the IDE, a selection of the first resource method, wherein the first resource method defines a first method for interacting with a first resource of the plurality of resources associated with the first web service;

determine a first authentication scheme for the first resource method, wherein the first authentication scheme defines an authentication mechanism required during execution of the first resource method to enable interaction with the first resource;

determine a development language for a first authentication code;

select a language-specific code template from a plurality of language-specific code templates listed in the first authentication scheme based on the development language, wherein selecting the language-specific code template comprises: obtaining an artifact identifier for an artifact from the first authentication scheme, wherein the artifact corresponds to an authentication mechanism defined in the first authentication scheme; and selecting the language-specific code template from the first authentication scheme using the artifact identifier and the development language; and generate, in response to the selection, a first authentication code for the first resource method using the language-specific code template, wherein the first authentication code is displayed on the output device, and wherein the first authentication code enables the user of the IDE executing the first resource method to interact with the first resource.

9. The system of claim 8, wherein the IDE further executes on the processor to:

obtain the first authentication scheme;

generate a first resource model using the first service definition, wherein the first resource model comprises the plurality of resources, wherein each of the plurality of the resources is associated with a plurality of resource methods, and wherein the first resource method is one of the plurality of resource methods; and generate a menu comprising the plurality of resources in the first resource model, wherein each of the plurality of resources is presented with at least one of the plurality of resource methods.

10. The system of claim 8, wherein the first service definition is defined using WADL.

11. The system of claim 8, wherein the IDE further executes on the processor to:

receive a selection of a second resource method, wherein the second resource method defines a second method for interacting with a second resource associated with a second web service;

determine a second authentication scheme for the second resource method, wherein the second authentication scheme defines an authentication mechanism required during execution of the second resource method to enable interaction with the second resource; and generate second authentication code for the second resource method using the second authentication scheme, wherein the second authentication code enables a user executing the second resource method to interact with the second resource, wherein the first authentication scheme and the second authentication scheme are defined using an authentication schema.

12. The system of claim 10, wherein the first authentication scheme, the second authentication scheme, and authentication schema are implemented using XML.

13. The system of claim 12, wherein the authentication schema comprises at least one tag from a group consisting of <saas-services>, <saas-metadata>, <description>, <display-name>, <header>, <params>, <methods>, <localizing-bundle>, <code-gen>, <artifacts>, <artifact>, <authentication>, <authenticator>, <http-basic>, <api-key>, <signed-url>, <session-key>, <custom>, <use-templates>, <desktop>, <web>, <template>, and <group>.

14. A non-transitory computer readable medium comprising executable instructions for generating authentication code for web service resources by an Integrated Development Environment (IDE), wherein executable instructions comprise instructions to:

obtain, by the IDE, metadata of a first web service;

obtain, by the IDE, a first service definition from the metadata, wherein the first service definition defines a plurality of resources associated with the first web service;

obtain, by the IDE, a first authentication scheme;

generate, by the IDE, a first resource model using the first service definition, wherein the first resource model comprises the plurality of resources, wherein each of the plurality of the resources is associated with a plurality of resource methods, and wherein the first resource method is one of the plurality of resource methods;

generate, by the IDE, a menu comprising the plurality of resources in the first resource model, wherein each of the plurality of resources is presented with at least one of the plurality of resource methods;

receive, from a user of the IDE and by the IDE, a selection of a first resource method, wherein the first resource method defines a first method for interacting with a first resource associated with the first web service;

determine, by the IDE, the first authentication scheme for the first resource method, wherein the first authentication scheme defines an authentication mechanism required during execution of the first resource method to enable interaction with the first resource; and determine a development language for the first authentication code;

select a language-specific code template from a plurality of language-specific code templates listed in the first authentication scheme based on the development language, wherein selecting the language-specific code template comprises: obtaining an artifact identifier for an artifact from the first authentication scheme, wherein the artifact corresponds to an authentication mechanism defined in the first authentication scheme; and selecting the language-specific code template from the first authentication scheme using the artifact identifier and the development language; and generate, by the IDE and in response to the selection, a first authentication code for the first resource method using the language-specific code template, wherein the first authentication code enables the user of the IDE executing the first resource method to interact with the first resource.

* * * * *